(12) United States Patent
Kaewka et al.

(10) Patent No.: US 10,965,768 B2
(45) Date of Patent: *Mar. 30, 2021

(54) AUTOMATIC BROWSER INACTIVITY DETECTION METHOD AND APPARATUS

(71) Applicant: VERIZON MEDIA INC., New York, NY (US)

(72) Inventors: Thanawat Kaewka, Sunnyvale, CA (US); Hang Ye, San Jose, CA (US); Thomas Hoffmann, San Francisco, CA (US); Deepesh Mittal, Santa Clara, CA (US)

(73) Assignee: VERIZON MEDIA INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,430

(22) Filed: Feb. 25, 2020

(65) Prior Publication Data

US 2020/0195738 A1    Jun. 18, 2020

Related U.S. Application Data

(63) Continuation of application No. 15/999,143, filed on Aug. 17, 2018, now Pat. No. 10,574,768.

(51) Int. Cl.
*H04L 29/08* (2006.01)
*G06Q 30/02* (2012.01)
(Continued)

(52) U.S. Cl.
CPC ............ *H04L 67/24* (2013.01); *G06F 1/3231* (2013.01); *G06F 9/54* (2013.01); *G06F 16/95* (2019.01);
(Continued)

(58) Field of Classification Search
CPC ......... H04L 29/0809; H04L 29/08675–08684; H04L 41/0253; H04L 67/02;
(Continued)

(56) References Cited

U.S. PATENT DOCUMENTS 8,250,228 B1   8/2012   Johansson
8,949,406 B2   2/2015   Wenig et al.
(Continued)

*Primary Examiner* — Brendan Y Higa
(74) *Attorney, Agent, or Firm* — James J. DeCarlo; Greenberg Traurig, LLP

(57) ABSTRACT

Disclosed are systems and methods for improving interactions with and between computers in controlling external programs executed by a browser application. The disclosed systems and methods provide systems and methods for automatically identifying an external program in a document definition used in rendering a document display in a user interface of the browser application. In response to detecting inactivity in connection with the document display, the disclosed systems and methods generate a first modified document definition, by modifying the document definition, to suspend execution of the external program in a first modified document display based on the first modified document definition. In response to activity in connection with the first modified document display, the disclosed systems and methods generate a second document definition, by modifying the first document definition, to restore execution of the external program in a second modified document display based on the second modified document definition.

20 Claims, 13 Drawing Sheets

(51) Int. Cl.
  *G06F 9/54* (2006.01)
  *G06F 16/95* (2019.01)
  *H04L 12/24* (2006.01)
  *G06F 1/3231* (2019.01)
  *G06F 16/957* (2019.01)

(52) U.S. Cl.
  CPC ..... *G06F 16/9577* (2019.01); *G06Q 30/0277* (2013.01); *H04L 29/0809* (2013.01); *H04L 29/08675* (2013.01); *H04L 41/0253* (2013.01); *H04L 67/22* (2013.01)

(58) Field of Classification Search
  CPC ............. H04L 67/22–24; G06F 1/3231; G06F 16/957–986
  See application file for complete search history.

(56) References Cited

U.S. PATENT DOCUMENTS

| | | | |
|---|---|---|---|
| 9,606,703 B2 * | 3/2017 | Sullivan | G06F 9/5022 |
| 2008/0228910 A1 * | 9/2008 | Petri | G06F 11/3438 |
| | | | 709/224 |
| 2015/0095758 A1 | 4/2015 | Rossi et al. | |
| 2015/0095838 A1 | 4/2015 | Rossi et al. | |

* cited by examiner

902 — `<iframe style="position: absolute; z-index: 10; width: 160px; height: 620px; top: 0px; left: 0px; visibility: inherit; display: block;" id="tgtSKY" src="https"//s.yimg.com/rg/darla/3-4-1/html/r-sf.html" async frameborder="no" scrolling="no" allowtransparency="true" hidefocus="true" tabindex="-1" marginwidth="0" marginheight="0"> == $0`

904 — `<div id="tgtSKY" style="visibility: inherit;"></div> == $0`

906 — `<iframe style="position: absolute; z-index: 10; width: 160px; height: 620px; top: 0px; left: 0px; visibility: inherit; display: block;" id="tgtSKY" src="https"//s.yimg.com/rg/darla/3-4-1/html/r-sf.html" async frameborder="no" scrolling="no" allowtransparency="true" hidefocus="true" tabindex="-1" marginwidth="0" marginheight="0"> == $0`

AUTOMATIC BROWSER INACTIVITY DETECTION METHOD AND APPARATUS

CROSS-REFERENCE TO RELATED APPLICATIONS

This application claims the benefit of and is a continuation of U.S. patent application Ser. No. 15/999,143, filed Aug. 17, 2018, titled "Automatic Browser Inactivity Detection Method and Apparatus", which is incorporated by reference herein its entirety.

FIELD OF THE DISCLOSURE

The present disclosure relates to the efficient management of code executed by an application, such as a browser application.

BACKGROUND

Currently, an application, such as a browser application (or web browser), can execute external code that is not a part of the application. By way of example, a browser application might execute a web document, or component thereof, which is external to the browser application. A browser application executes a document, e.g., a web document, to generate a user interface display in the browser's user interface. In some cases, the web document can include a reference to a second, separate document provided by an entity other than the entity providing the first document. While it is being executed by a computing device, each document executed by the browser application (and the browser application itself) consumes resources, such as central processing unit (CPU) and memory resources, of the computing device.

SUMMARY

The present disclosure provides novel systems and methods for automatic management and control of resources consumed by (or allocated to) an external program, such as a web document or component thereof. The external program that is controlled in the manner disclosed herein is also referred to herein as a controlled program. By way of a non-limiting example, an external program can be initiated by a browser application in connection with a web application (e.g., an electronic mail application or other web-based application) using a browser application to render its user interface. An external program can be initiated by the browser application in connection with any web document executed by the browser application to render a display.

A browser application displays a document, such as a web document (e.g., a web page received by the browser from a web site or other location such as a local location or a location on the internet), based on a definition that is typically written in a programming language referred to as a markup language (e.g., Hypertext Markup Language, or HTML). In some cases, the document can include other code, such as JavaScript® code. The browser application may invoke, or initiate, execution of components of the web document that is being loaded by the browser application. The external program can be provided by a third-party (e.g., an entity other than the entity providing the browser application). The external program can be initiated by the browser program based on a reference in a web document's definition. By way of a non-limiting example, the external program can be a JavaScript® program, an HTML element, etc.

By way of a non-limiting example, the external program initiated by a browser application might be a media player (with user interface controls for controlling playback). As yet another example, the external program might be a content component to display content (e.g., image content, animated content, audio content, video content, multimedia content, etc.) in a window, frame, or other display area, of the browser application. Conventionally, once invoked, a browser application has little if any control over the media player or content, or the resources being consumed by the media player or content.

While an external program can provide additional functionality, the external program does so at the expense of computing resources. The external program expends computing resources even while the external program is inactive (also referred to herein as running in the background). The external program ties up computing resources (e.g., memory, CPU, etc.) even while inactive, such that the resources cannot be allocated and used by other executing code (e.g., the browser application, a window or tab of the browser application, an application other than the browser application, another external program, etc.) initiated or executing on the computing device. The resources consumed by the external program can negatively impact performance of the web browser and a web-based application using the web browser. Examples of negative performance impacts include slower response time, execution stoppage or crash, etc.

Disclosed systems and methods automatically manage and control an external program and provide an ability to automatically determine that an external program is inactive and to terminate or pause execution of the external program in response to detecting the inactivity. Computing resources, such as CPU and memory resources, are conserved by terminating or pausing the external program. By way of a non-limiting example, CPU resources can be reallocated to an active process, program, component, etc. By way of another non-limiting example, memory resources of the external program can be conserved (e.g., released or no new memory allocated). Conserved memory resources can be used by another external program or other process, program, etc. being executed by a computing device. In so doing, computing resources can be used by an active process, program, component of the web browser, etc., thereby improving performance of the computing device as a whole, improving performance of the active process(es), program (s), component(s), etc., and improving performance of the browser application and web-based applications using the browser application for rendering a user interface. Furthermore, it avoids negative performance issues, e.g., slow execution, execution crashes, etc.

In addition and after an external program is terminated in response to detected inactivity, the disclosed systems and methods provide further automatic management and control of the inactive external program by monitoring to detect activity in connection with the external program, and invoking, or reinitiating, the external program in response to detecting activity in connection with the external program. By way of a non-limiting example, assuming for the sake of example that an external program was invoked in connection with a web-based messaging application (e.g., a web-based electronic mail, or email, application) and was terminated in response to a detection that the web-based messaging application is inactive, the management and control capability disclosed herein detects activity in connection with the web-based application and reinitiates the external program in response.

The automatic management and control of an external program provided by the disclosed systems and methods conserve computing resources, which has beneficial impact on the execution and performance of programs, processes, etc. being executed on a computing device. This presents improvements and efficiencies for a computing device as a whole and the programs, processes, etc. being executed by the computing device. The improvements and efficiencies inure to a browser application executing on the computing device and to each web-based application using the browser application.

According to some embodiments, the disclosed systems and methods directly (or indirectly via a browser application executing on a computing device) receive a document. The received document or a component thereof can be considered to be an external program. In one non-limiting example, the received document might include a content component that causes content (e.g., image, audio, video or multimedia content) being displayed (or played) in a display (of the document) by the browser application. The received document is received and processed by the browser application executing on the computing device. In one example, the received document is parsed to generate an internal representation of the document, such as a document object model (DOM) internal representation, which is used by the browser application to render a user interface display of the document. In a case that the document includes a content component, the user interface display generated by the browser application includes the content specified by the content component.

According to some embodiments, the disclosed systems and methods then monitor the state of an external document (e.g., the document as a whole or a component of the document). In accordance with at least one embodiment, a listener registers, in connection with each external program, to receive notification of an event (e.g., a change in state from active to inactive and vice versa). Examples of events that might occur (and for which a notification can be provided to the browser application) include a visibility change and a focus change. A visibility change event occurs when an element (e.g., a document, external program, etc.) becomes hidden or conversely when an element becomes visible. Assuming, for the sake of a non-limiting example, that the external program is a content component of a document, the external program becomes hidden when at least the portion of the document containing the content component becomes hidden by, for example, another display (e.g., hidden by display of another document's display, another window, etc.), when the tab (e.g., a tabbed window of the browser application) containing the content component becomes hidden (e.g., when another tab of a web browser window is selected), etc. Other examples of events include focus and blur, which can be used to determine that the focus of the user is either with an element or away from the element (e.g., click input received from the user indicates the user's focus or lack thereof).

In accordance with some embodiments, the disclosed systems and methods cause the execution of the external program to either be paused or terminated in response to a detected inactivity in connection with the external program. Assuming for the sake of a non-limiting example that the external program comprises a content component of a web document and an internal representation was generated for the web document and included the content component, the internal representation of the web document can be automatically modified to remove the external program from the internal representation, or to otherwise render the external program inoperable in the internal representation. Alternatively, the web document can automatically modify the web document and cause the modified web document to be used to generate a modified internal representation; and the modified internal representation can then be used to update (re-render) the display excluding the content component. As yet another example, the modification that is made in response to detecting inactivity of a content component (which is causing content to be played) can comprise an instruction to pause playback of the content while inactive (e.g., the content becomes invisible or is not the focus of the user), and the modification that is made in response to detecting activity of in connection with a content component can comprise an instruction to initiate playback of the content.

In accordance with some embodiments, the disclosed systems and methods continue monitoring for changes in the state of an inactive element, e.g., monitoring to detect a change in visibility, focus, etc. in connection with the inactive external program. In one example, in response to a change in state from inactive to active, the disclosed systems and methods can modify the document (or the internal representation of the document) to render operable (or restore execution of) the external program. In a case that the content is paused in response to inactivity, the disclosed systems and methods can cause the content to begin playing in response to detected activity.

It will be recognized from the disclosure herein that embodiments of the instant disclosure provide improvements to a number of technology areas, for example those related to systems and processes that provide web browsing capabilities, web-based (or cloud-based) applications that use a web browser to render a user interface, access to web-based documents and content provided by web site providers, search engines and the like. The disclosed systems and methods can effectuate increased stability and efficiency of a web browser and conservation of computing resources, as the disclosed systems and methods, inter alia, detect inactivity in programs, respond to the inactivity by pausing or terminating execution of the inactive program, detect activity in connection with an inactive program and respond to the activity by starting execution of the program.

Applications, e.g., productivity applications such as web-based or cloud-based applications, are frequently left open and running in the browser application. Due to the nature of external programs (e.g., the consumption of computing resources by the external program(s)), long-lived browser session can consume an excessive amount of computing resources, which can ultimately slow down program execution. The disclosed systems and methods minimize the impact of the external program(s) by minimizing the computing resources used by the external program(s) based on activity/inactivity. In a test conducted using a web-based electronic mail application in connection with the functionality disclosed herein, the present inventors found a marked improvement in the overall performance and responsiveness. In addition to an improved use of computing resources, metrics associated with the application (e.g., message-read and compose latency measures indicative of slow execution) were improved and a significant reduction is runtime errors (e.g., "out of memory" errors) was achieved. In addition and by way of a non-limiting example, using the functionality disclosed herein the number of browser users experiencing a runtime exception (e.g., an "out of memory" exception)

improved from 15% to 1% of users. Such improvements are not limited to web-based (or cloud-based) applications, but can be achieved with any browsing activities as well.

The disclosed systems and methods provide systems and methods for automatically identifying an external program in a document definition used in rendering a document display in a user interface of the browser application. In response to detecting inactivity in connection with the document display, the disclosed systems and methods generate a first modified document definition, by modifying the document definition, to suspend execution of the external program in a first modified document display based on the first modified document definition. In response to activity in connection with the first modified document display, the disclosed systems and methods generate a second document definition, by modifying the first document definition, to restore execution of the external program in a second modified document display based on the second modified document definition.

In accordance with one or more embodiments, a method is disclosed which includes receiving, at a computing device, a document definition for use by a browser application to generate a document display in a user interface of the browser application; identifying, via the computing device executing an external program controller, a definition of an external program in the document definition; detecting, by the external program controller, inactivity in connection with the document display in the user interface of the browser application; in response to detection of the inactivity, automatically generating, by the external program controller modifying the document definition, a first modified document definition, such that execution of the external program is suspended in a first modified document display, in the user interface of the browser application, rendered by the browser application, based on the first modified document definition; detecting, by the external program controller, activity in connection with the first modified document display in the user interface of the browser application; and in response to detection of the activity event, automatically generating, by the external program controller modifying the first modified definition, a second modified definition, such that execution of the external program is restored in a second modified document display, in the user interface of the browser application, based on the second modified document definition.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically extracting and creating animated GIFs from a video file.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 3:
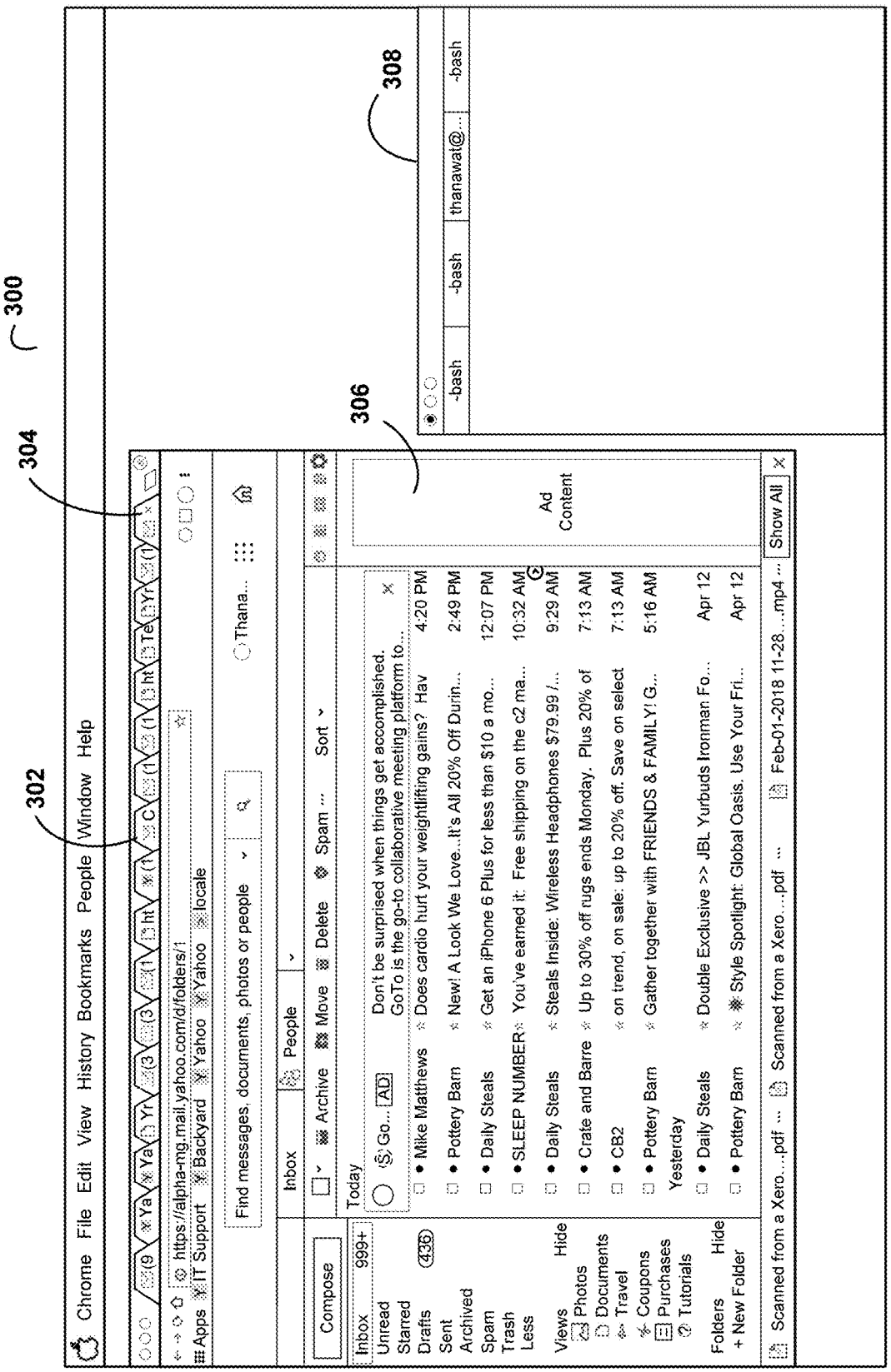
Figure 4:
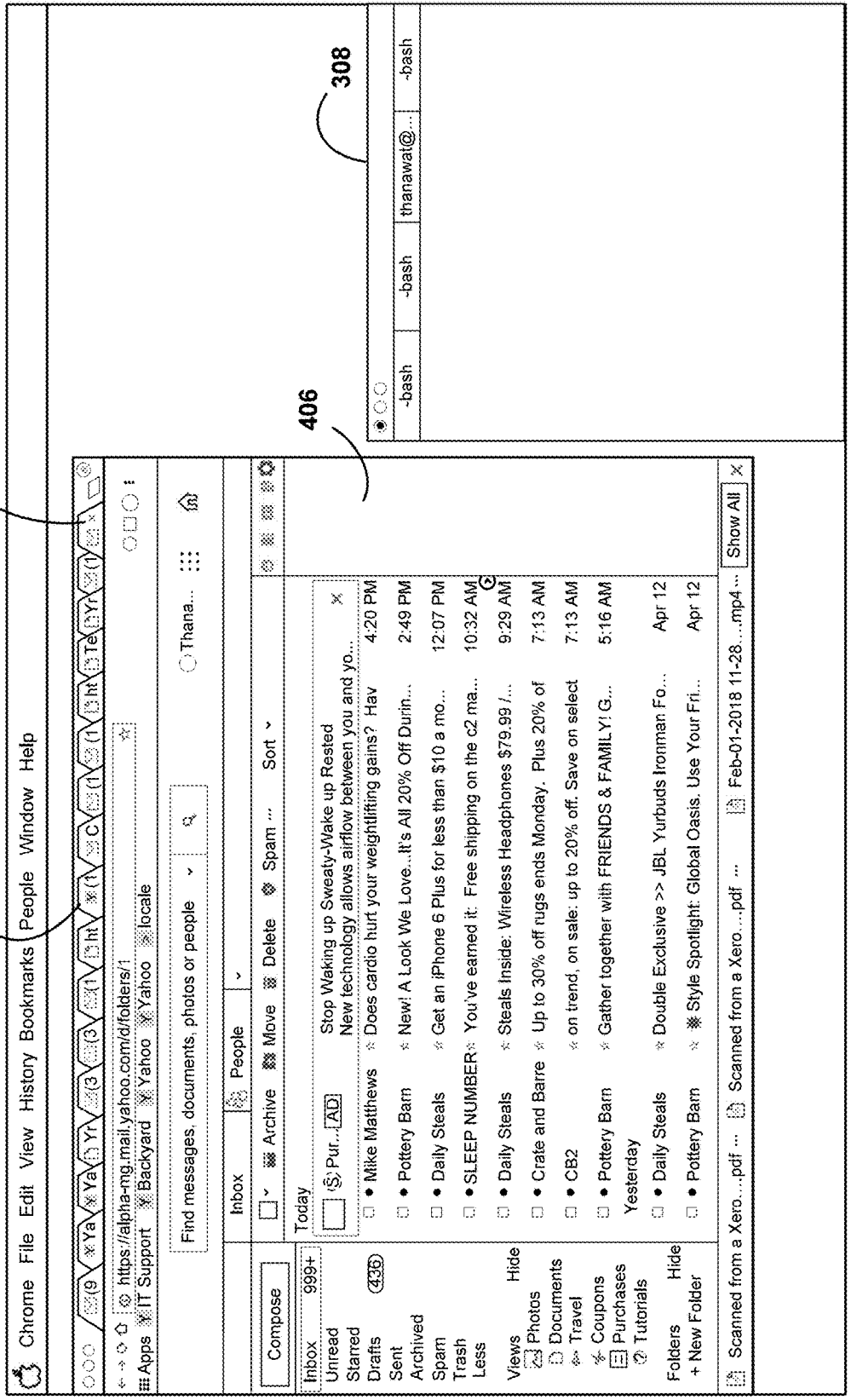

FIGS. 3 and 4 provide exemplary examples in accordance with some embodiments of the present disclosure.

Figure 5:
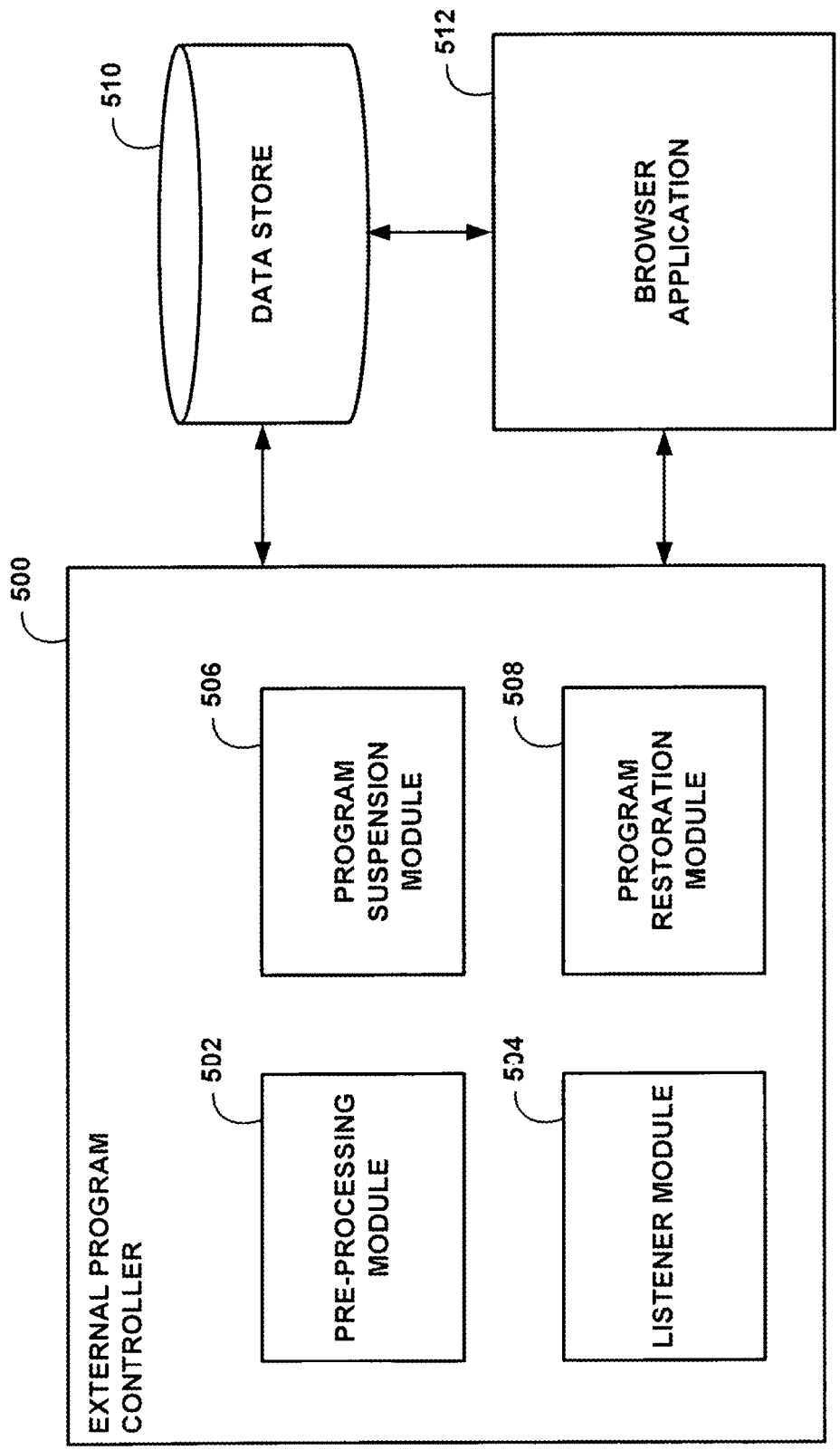
Figure 6:
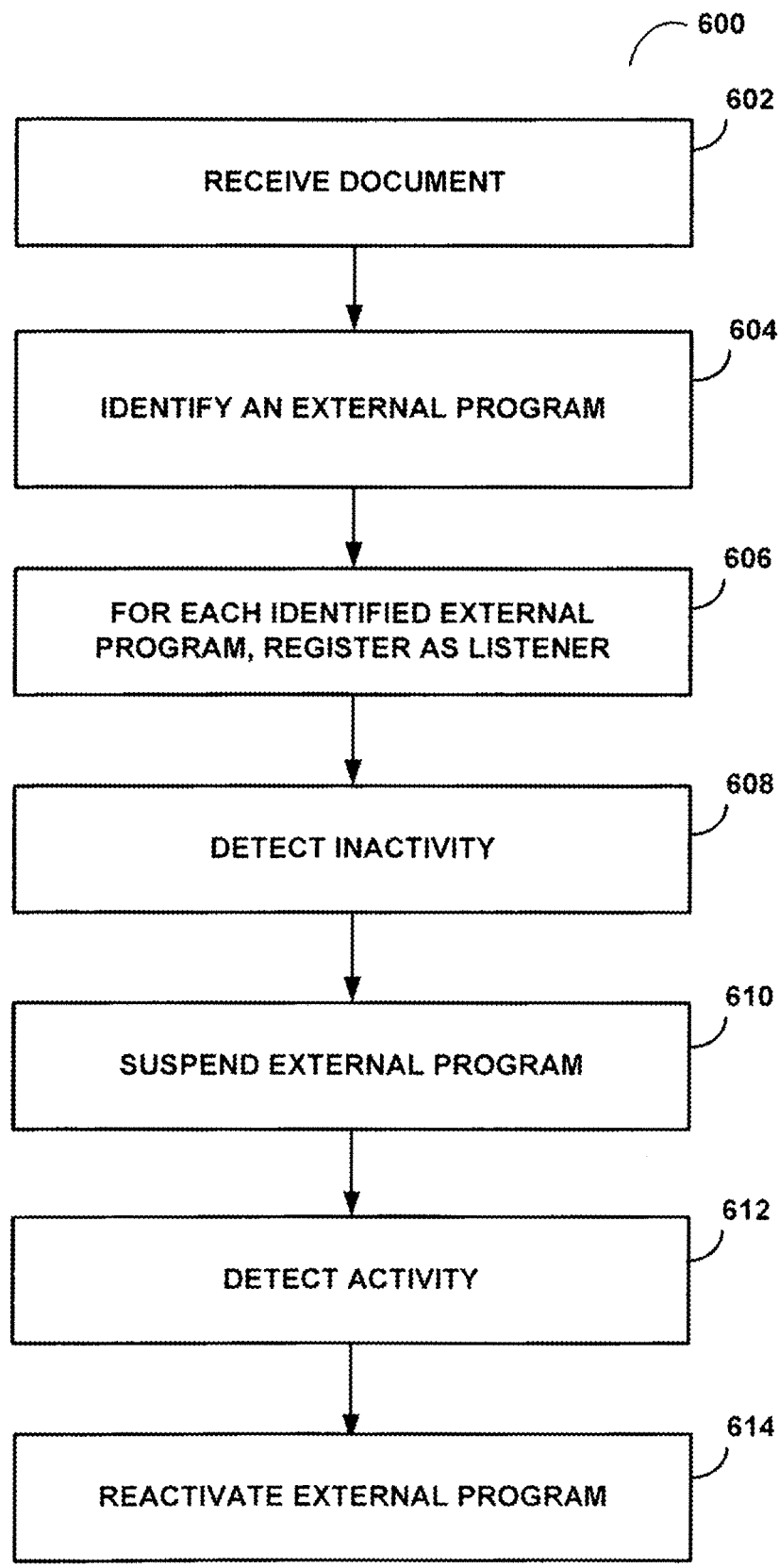
Figure 11:
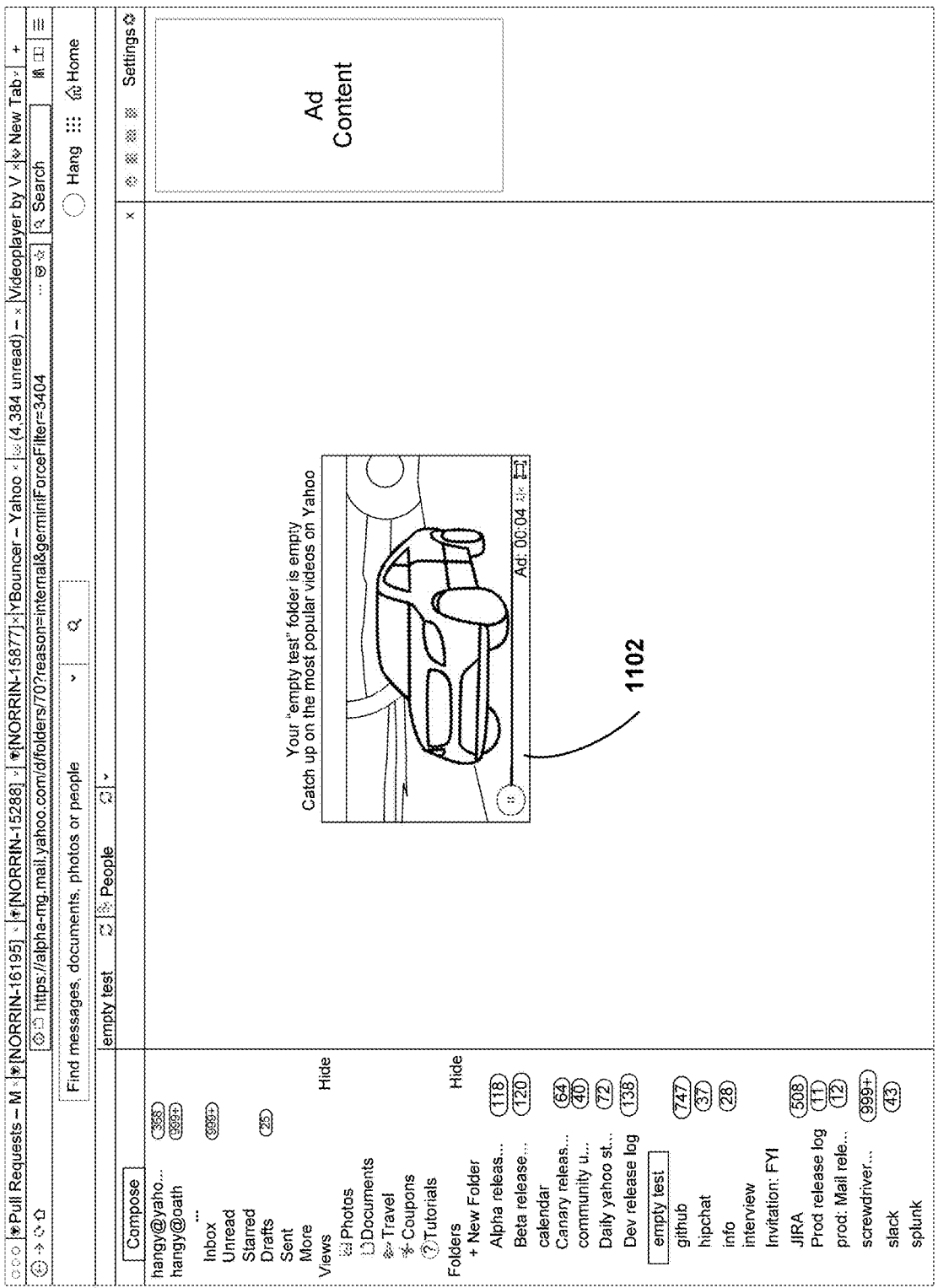
Figure 12:
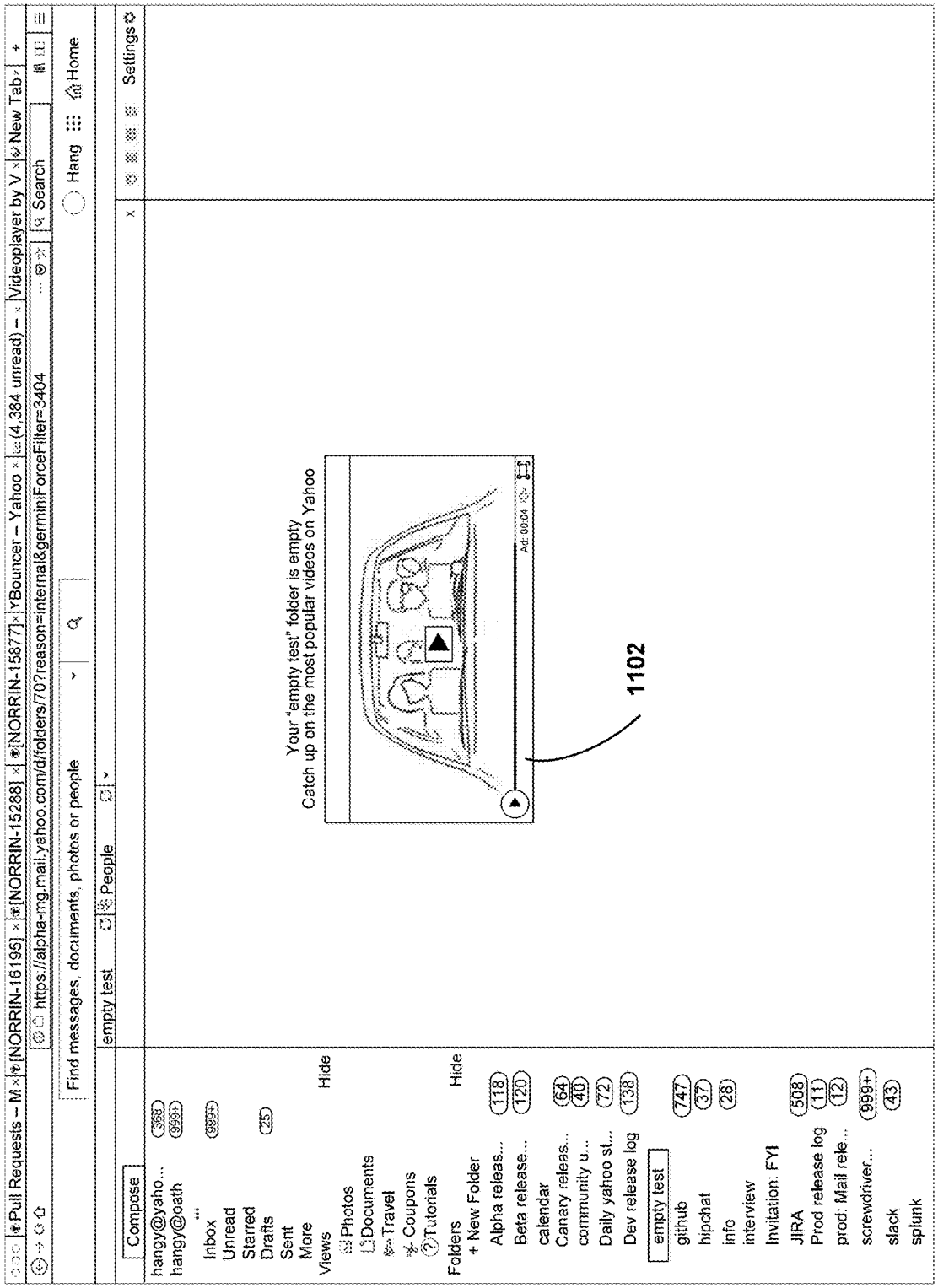
Figure 13:
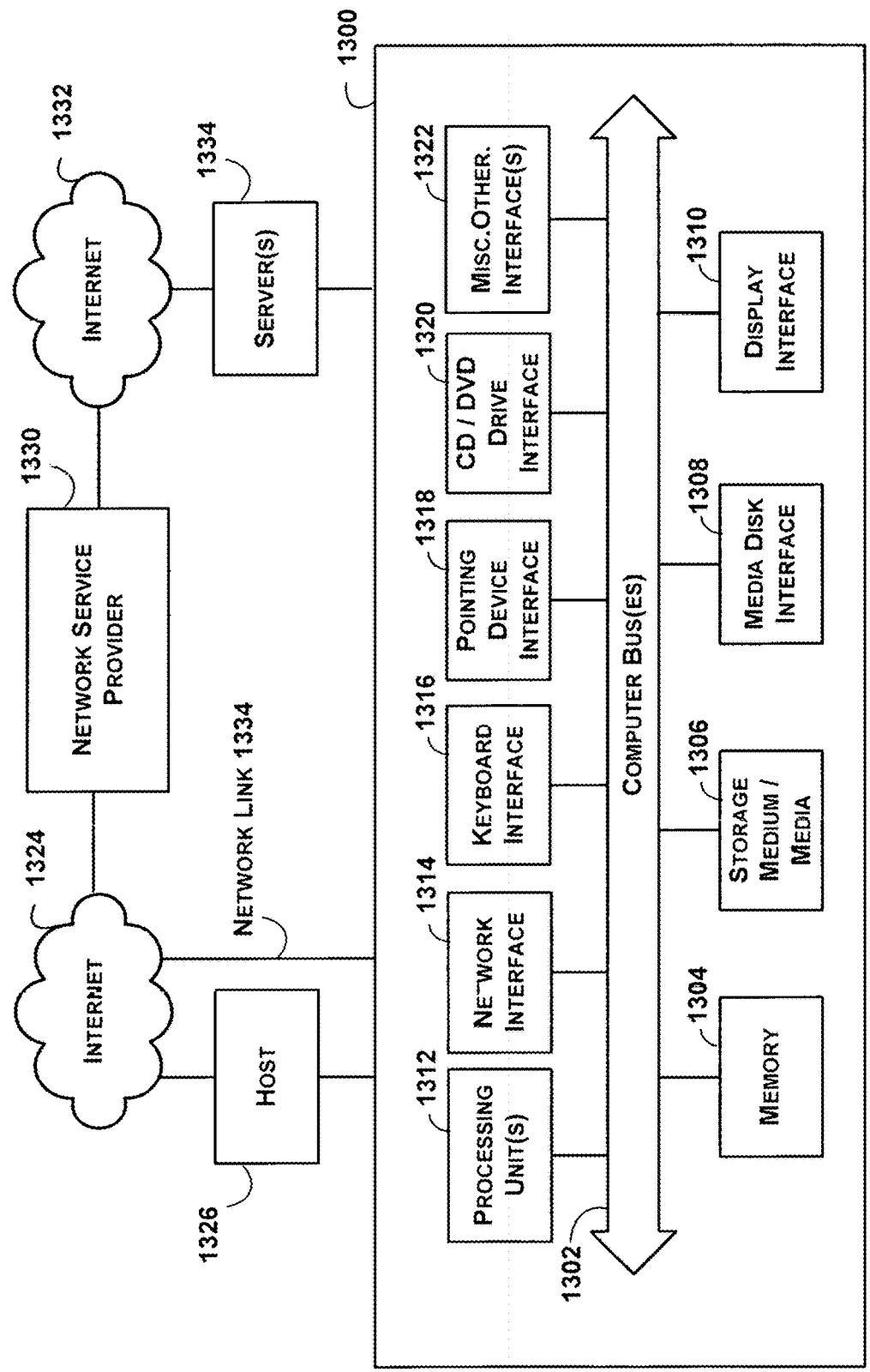

FIG. 5 is a schematic block diagram illustrating components of an exemplary system in accordance with embodiments of the present disclosure;

FIG. 6 is a flowchart illustrating steps performed in accordance with some embodiments of the present disclosure;

Figure 10:
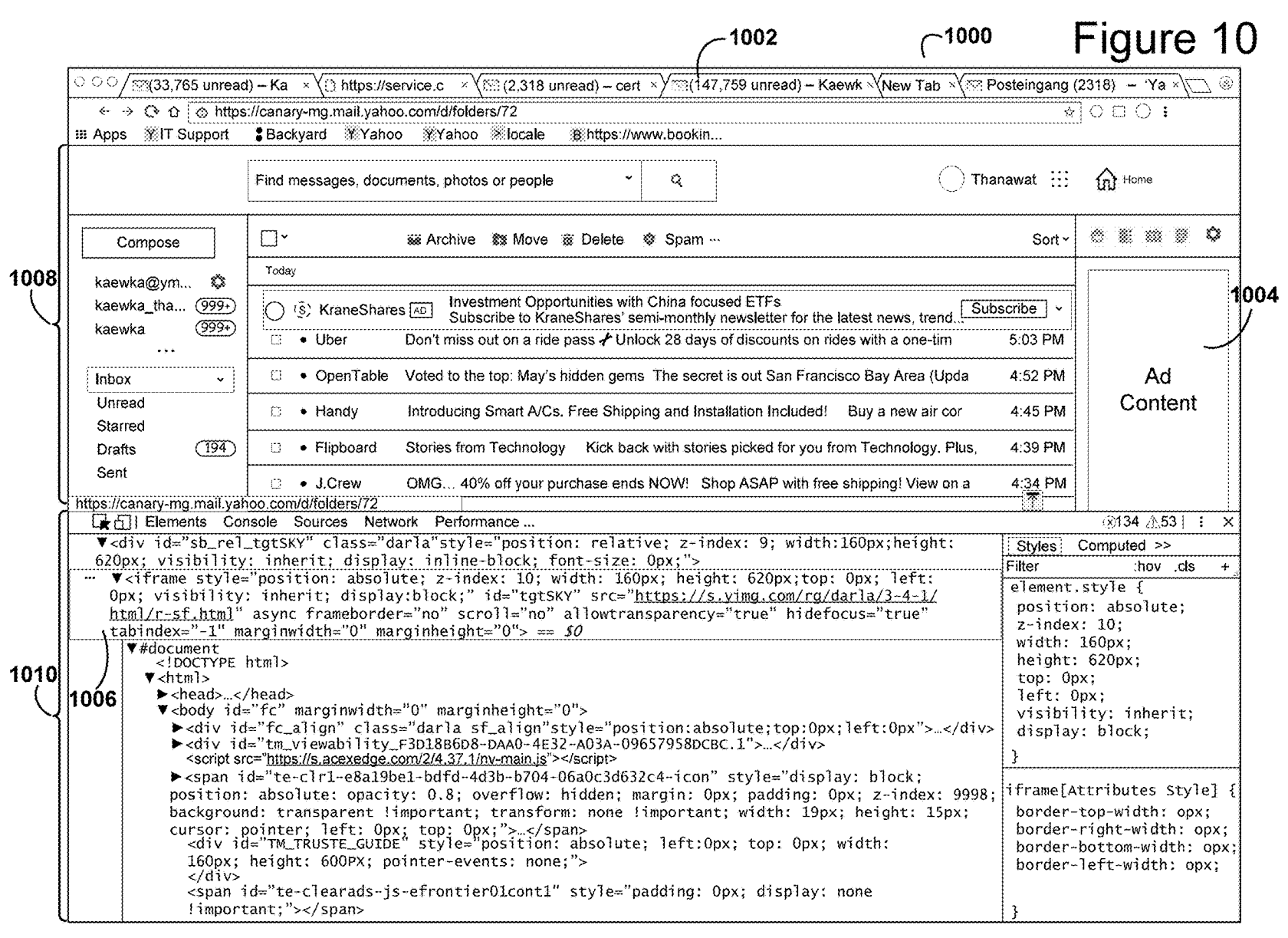

FIGS. 7-12 provide exemplary examples in accordance with some embodiments of the present disclosure; and FIG. 13 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, a browser application generates a user interface display based on a definition of a document, such as a web page. The document definition contains a number of elements typically specified using a markup language (e.g., Hypertext Markup Language, or HTML). The web browser executing on a computing device receives the document (e.g., from a web site or other location), parses the document's definition and then displays the document's elements in a display, such as a window (or tab of window) of the browser application's user interface. In parsing the document definition, the web browser may generate an internal representation of the document definition using the document definition. In one example, the internal representation of the document definition can be a tree structure (e.g., a Document Object Model, of DOM) comprising a number of nodes, and each node can be an object representing a portion (e.g., one or more elements) of the document.

One example of an element that may be included in a document's definition is an IFrame element. The IFrame element can be used, for example, to insert another document within a current document. The other document can reference an external program and/or external content from a source, e.g., a third-party source. The content can be any type of content, such as and without limitation image, audio, video, multimedia, etc. content. In some cases, the content can be advertising content.

The following provides an example of an HTML tag for an IFrame element:

<iframe src="ContentSsourceURL"></iframe>, where the src attribute specifies the location (e.g., in the form of a universal resource locator, or URL) of another document or content. Although not shown in the above example, the IFrame element can include a script element that includes one or more functions. The iframe tag results in an iframe object being generated in the internal representation (e.g., a DOM internal representation). In the internal representation, the iframe object (corresponding to the iframe tag) can include a number of functions, e.g., a function specified using a script element.

By way of a non-limiting example, the external program initiated by a browser application might be a media player (with user interface controls for controlling playback). As yet another example, the external program might be a content component to display content (e.g., image content, animated content, audio content, video content, multimedia content, etc.) in a window, frame, or other display area, of the browser application. Conventionally, once invoked, a browser application has little if any control over the media player or content, or the resources being consumed by the media player or content.

While an external program can provide additional functionality, the external program does so at the expense of computing resources. The external program expends computing resources even while the external program is inactive (also referred to herein as running in the background). The external program ties up computing resources (e.g., memory, CPU, etc.) even while inactive, such that the resources cannot be allocated and used by other executing code (e.g., the browser application, a window or tab of the browser application, an application other than the browser application, another external program, etc.) initiated or executing on the computing device. The resources consumed by the external program can negatively impact performance of the web browser and a web-based application using the web browser. Examples of negative performance impacts include slower response time, execution stoppage or crash, etc.

The instant disclosure provides a novel solution addressing the problems associated with an inactive external program of an application. Disclosed systems and methods automatically manage and control an external program and provide an ability to automatically determine that an external program is inactive and to terminate or pause execution of the external program in response to detecting the inactivity. Computing resources, such as CPU and memory resources, are conserved by terminating or pausing the external program. By way of a non-limiting example, CPU resources can be reallocated to an active process, program, component, etc. By way of another non-limiting example, memory resources of the external program can be conserved (e.g., released or no new memory allocated). Conserved memory resources can be used by another external program or other process, program, etc. being executed by a computing device. In so doing, computing resources can be used by an active process, program, component of the web browser, etc., thereby improving performance of the computing device as a whole, improving performance of the active process(es), program(s), component(s), etc., and improving performance of the browser application and web-based applications using the browser application for rendering a user interface. Furthermore, it avoids negative performance issues, e.g., slow execution, execution crashes, etc.

In addition and after an external program is terminated in response to detected inactivity, the disclosed systems and methods provide further automatic management and control of the inactive external program by monitoring to detect activity in connection with the external program, and invoking, or reinitiating, the external program in response to detecting activity in connection with the external program. By way of a non-limiting example, assuming for the sake of example that an external program was invoked in connection with a web-based messaging application (e.g., a web-based electronic mail, or email, application) and was terminated in response to a detection that the web-based messaging application is inactive, the management and control capability disclosed herein detects activity in connection with the web-based application and reinitiates the external program in response.

The automatic management and control of an external program provided by the disclosed systems and methods conserve computing resources, which has beneficial impact on the execution and performance of programs, processes, etc. being executed on a computing device. This presents improvements and efficiencies for a computing device as a whole and the programs, processes, etc. being executed by the computing device. The improvements and efficiencies inure to a browser application executing on the computing device and to each web-based application using the browser application.

According to some embodiments, the disclosed systems and methods directly (or indirectly via a browser application executing on a computing device) receive a document. The received document or a component thereof can be considered to be an external program. In one non-limiting example, the received document might include a content component that causes content (e.g., image, audio, video or multimedia content) being displayed (or played) in a display (of the document) by the browser application. The received document is received and processed by the browser application executing on the computing device. In one example, the received document is parsed to generate an internal representation of the document, such as a document object model (DOM) internal representation, which is used by the browser application to render a user interface display of the document. In a case that the document includes a content component, the user interface display generated by the browser application includes the content specified by the content component.

According to some embodiments, the disclosed systems and methods then monitor the state of an external document (e.g., the document as a whole or a component of the document). In accordance with at least one embodiment, a listener registers, in connection with each external program, to receive notification of an event (e.g., a change in state from active to inactive and vice versa). Examples of events that might occur (and for which a notification can be provided to the browser application) include a visibility change and a focus change. A visibility change event occurs when an element (e.g., a document, external program, etc.) becomes hidden or conversely when an element becomes visible. Assuming for the sake of a non-limiting example that the external program is a content component of a document, the external program becomes hidden when at least the portion of the document containing the content component becomes hidden by, for example, another display (e.g., hidden by display of another document's display, another window, etc.), when the tab (e.g., a tabbed window of the browser application) containing the content component becomes hidden (e.g., when another tab of a web browser window is selected), etc. Other examples of events include focus and blur, which can be used to determine that the focus of the user is either with an element or away from the element (e.g., click input received from the user indicates the user's focus or lack thereof).

In accordance with some embodiments, the disclosed systems and methods cause the execution of the external program to either be paused or terminated in response to detected inactivity in connection with the external program. Assuming, for the sake of a non-limiting example, that the external program comprises a content component of a web document and an internal representation was generated for the web document and included the content component, the internal representation of the web document can be automatically modified to remove the external program from the internal representation, or to otherwise render the external program inoperable in the internal representation. Alternatively, the web document can automatically modify the web document and cause the modified web document to be used to generate a modified internal representation, and the modified internal representation can then be used to update (re-render) the display excluding the content component. As yet another example, the modification that is made in response to detecting inactivity of a content component (which is causing content to be played) can comprise an instruction to pause playback of the content while inactive (e.g., the content becomes invisible or is not the focus of the user), and the modification that is made in response to detecting activity in connection with a content component can comprise an instruction to initiate playback of the content.

In accordance with some embodiments, the disclosed systems and methods continue monitoring for changes in the state of an inactive element, e.g., monitoring to detect a change in visibility, focus, etc. in connection with the inactive external program. In one example, in response to a change in state from inactive to active, the disclosed systems and methods can modify the document (or the internal representation of the document) to render operable (or restore execution of) the external program. In a case that the content is paused in response to inactivity, the disclosed systems and methods can cause the content to begin playing in response to detected activity.

It will be recognized from the disclosure herein that embodiments of the instant disclosure provide improvements to a number of technology areas, for example those related to systems and processes that provide web browsing capabilities, web-based (or cloud-based) applications that use a web browser to render a user interface, access to web-based documents and content provided by web site providers, search engines and the like. The disclosed systems and methods can effectuate increased stability and efficiency of a web browser and conservation of computing resources, as the disclosed systems and methods, inter alia, detect inactivity in programs, respond to the inactivity by pausing or terminating execution of the inactive program, detect activity in connection with an inactive program and respond to the activity by starting execution of the program.

The disclosed systems and methods can be implemented for any type of external program and for any type of content item, including, but not limited to, video, audio, images, text, and/or any other type of multimedia content. While functionality of disclosed systems and method are described herein as being implemented by a browser application, it should be understood that the functionality can be incorporated into any application, software component, hardware component or combination thereof.

Figure 1:
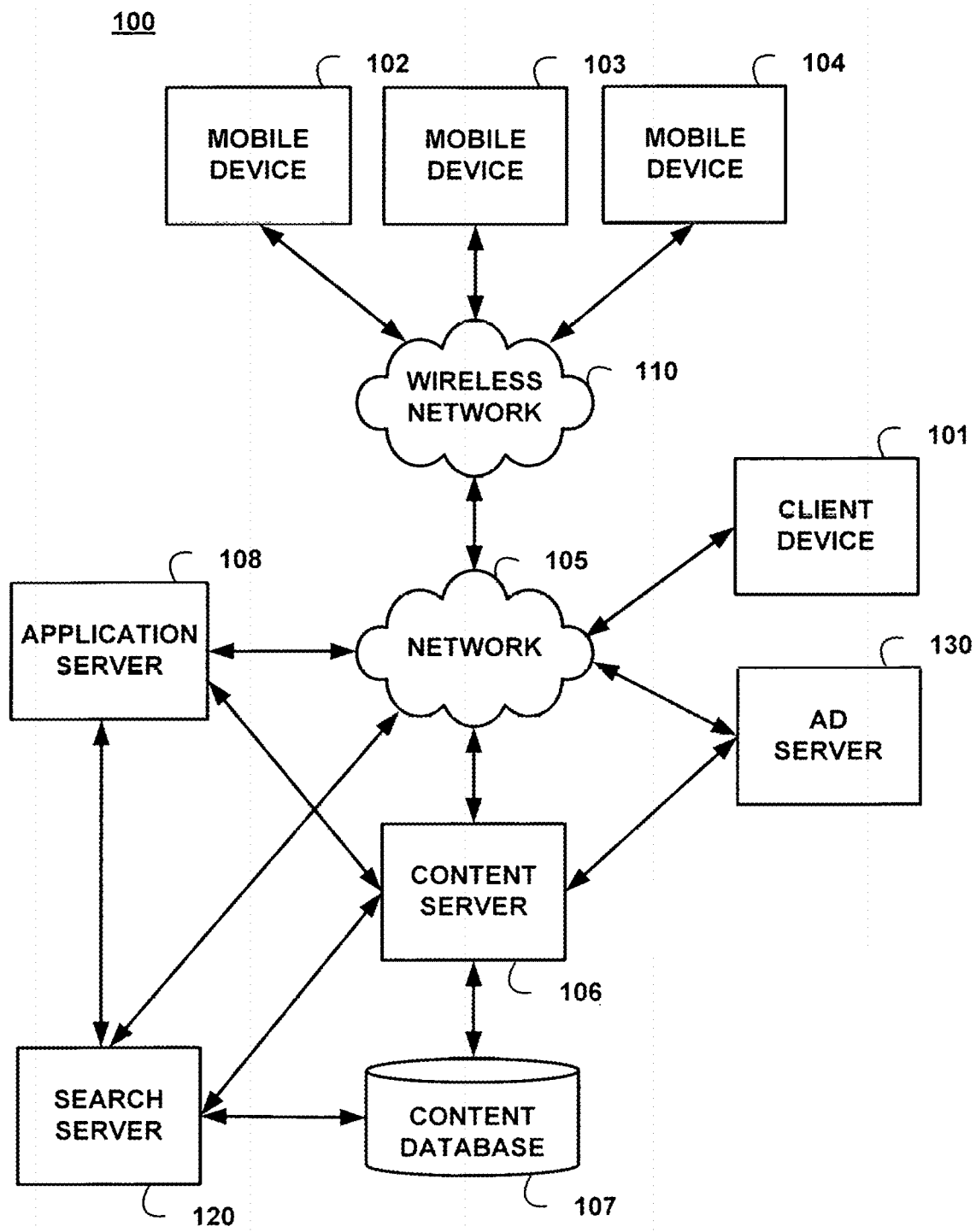
FIG. 1 is a schematic diagram illustrating an example of a network within which the systems and methods disclosed herein could be implemented according to some embodiments of the present disclosure.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refer to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
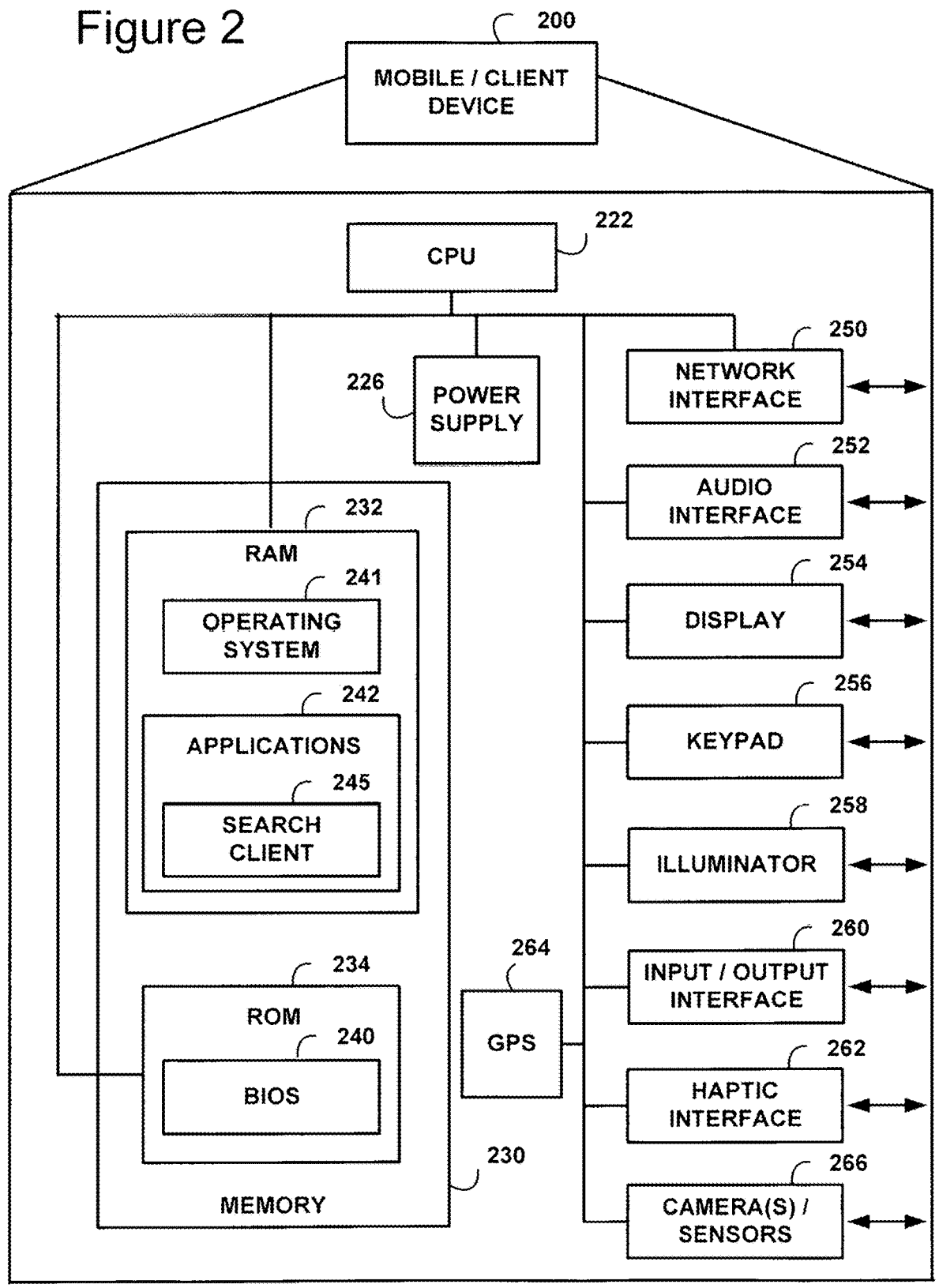
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

FIGS. 3 and 4 provide exemplary user interface examples in accordance with some embodiments of the present disclosure. With reference to FIG. 3, display 300 comprises windows 302 and 308. Window 302 is a window of a browser application that supports tabbed browsing user interface. Each tab of window 302 corresponds to a web document and each web document's display can be accessed, by the user, by selecting its corresponding tab. In the example of FIG. 3, tab 304 is selected causing a display of a web-based application (an electronic mail, or e-mail web application in the example) user interface. The displayed user interface corresponding to tab 304 includes a content component 306.

In the example of FIG. 3, window 302 is active and window 308 is inactive. Window 302 may become active due to the user selection of tab 304, for example. FIG. 4 provides an example of display 300 in response to a determination that window 302 is no longer active. In the example of FIG. 4, window 402 is an updated version of window 302 (of FIG. 3) in response to window 308 becoming the active window. In accordance with at least one embodiment, the systems and methods disclosed herein modify the underlying definition used by the browser application to render the user interface of tab 304 so that when the modified definition is used by the browser application to render tab 404 of FIG. 4, the user interface no longer includes content component 306. That is, the underlying definition is modified to, in effect, suspend (e.g., terminate or pause) execution of the external program corresponding to content component 306. As discussed in more detail below, the underlying definition can be modified to make the external program inoperable. Making the external program inoperable can be effectuated by cutting the external program's code from the definition, using comment notation, etc.

Tab 404 of window 402 of FIG. 4 corresponds to tab 304 of window 302 of FIG. 3 except that the display in tab 404 (rendered by the browser application using the modified document definition) lacks content component 306, as illustrated by reference 406 of FIG. 4. In accordance with at least one embodiment, the systems and methods disclosed herein detect activity (e.g., user selection of tab 404 of FIG. 4) and (in response to detecting the activity) modify (a second time) the underlying definition (to include the external program), such that when the browser application executes the modified definition to render the user interface, the external program corresponding to content component 306 is initiated and the user interface display shown in tab 304 of window 302 of FIG. 3 is rendered by the browser application. As discussed in more detail below, the underlying definition can be modified to insert the external program back into the definition. Insertion of the external program can be effectuated by inserting the external program's code into the definition, by removing the comment notation(s) associated with the code, etc.

Although not shown in FIGS. 3 and 4, it should be understood that a similar approach can be taken with each tab in windows 302 and 402. In other words, the underlying definition used to render a display corresponding to each unselected tab in windows 302 and 402 can be modified (a first time in response to detection of inactivity) so that when the browser application uses the modified definition to re-render the tab's display, execution of each external program (initiated by the browser application when originally rendering the tab's display, e.g., when the tab was first opened or selected by the user) is suspended (e.g., execution is terminated or paused). And, if activity is detected in connection with an unselected tab, the underlying definition can be modified (a second time to include each external program), such that when the browser application executes the modified definition to render the user interface, each external program's execution is initiated.

FIG. 5 is a block diagram illustrating the components for performing the systems and methods discussed herein. FIG. 5 includes external program controller (or engine) 500. Controller 500 can be a special purpose machine or processor. Some or all of controller 500 could be hosted by a host computing device, such as and without limitation an application server, content server, social networking server, web server, search server, content provider, email service provider, ad server, and the like, or any combination thereof. In accordance with one or more embodiments, controller 500 can be downloaded (e.g., from a host device) and executed in connection with an application (e.g., a browser application) on a user, or client, computing device (e.g., mobile device 102, 103 or 104, client device 101, or mobile/client device 200).

In FIG. 5, controller 500 is shown apart from any other application for simplicity of illustration. According to some embodiments, controller 500 can be embodied as a stand-alone application that executes on a user device. As discussed above, controller 500 can be installed and executed in connection with or as part of another application (e.g., a browser application) installed on the user's device. In some embodiments, the controller 500 can be a script, program or application.

The data store 510 can be any type of database or memory. Data store 510 can be used to store one or more web document definitions (as well as corresponding internal representation(s)) used by the browser application 512 to generate a user interface display. A document definition can be received via an electronic communications network (e.g., network 105 of FIG. 1) by a computing device (e.g., mobile device 102, 103 or 104, client device 101, or mobile/client device 200. The document definition can include a number of external program to be controlled using the systems and methods disclosed herein. By way of a non-limiting example, the document definition can include one or more <iframe> element definitions, each of which can be identified as an external program to be managed and controlled. It should be understood that the <iframe> element is one example and any of a number of elements specified using a markup language, such as HTLM or another markup language, a scripting language (e.g., JavaScript®), etc. can be identified as an external program. Other examples of elements considered to be external programs are discussed below. In addition, it should be understood that a document definition can be written in any language, whether known or to be known, without departing from the scope of the present disclosure.

The principal processor, computing device, or combination of computing devices that comprises hardware programmed in accordance with the special purpose functions herein is referred to for convenience as controller 500, and includes pre-processing module 502, listener module 504, program suspension module 506, and program restoration module 508. In some embodiments, pre-processing module 502 may be optional. In some embodiments, pre-processing module 502 is a part of browser application 512 (e.g., a portion of browser application 512 that parses a document's definition and generates an internal representation of the document). In some embodiments, one or more of modules 502, 504, 506 and 508 are part of browser application 512. It should be understood that the engine(s), controller(s) and modules discussed herein are non-exhaustive, as additional or fewer engines, controllers and/or modules (or sub-modules) may be applicable to the embodiments of the systems and methods discussed. The operations, configurations and functionalities of each module, and their role within embodiments of the present disclosure will be discussed with reference to FIG. 6.

As discussed in more detail below, the information processed by the controller 500 can be supplied to the data store 510 in order to ensure that the information housed in the data store 510 is up-to-date as the disclosed systems and methods function to manage and control each external program, as discussed in more detail below.

FIG. 6 provides a process flow overview in accordance with one or more embodiments of the present disclosure. Process 600 of FIG. 6 details steps performed in accordance with exemplary embodiments of the present disclosure for automatically managing and controlling an external program, e.g., an external program being executed by browser application 512. According to some embodiments, as discussed herein with relation to FIG. 6, the process involves listening to detect inactivity in connection with an external program and responding to an inactivity detection by automatically suspending (or automatically causing suspension of the) execution of the external program. The process further comprises detecting activity in connection with a suspended program and automatically restoring (or automatically causing restoration of the) execution of the program. The process is described in more detail below.

At step 602, a document (also referred to herein as a web document or document definition) is received by the controller 500 directly or via browser application 512. The document is to be used by the browser application to generate, or render, a display in its user interface. The document comprises a definition of a number of elements for use in generating the user interface display. By way of a non-limiting example, the document could comprise a definition of a user interface display of a web-based application (e.g., such as the web-based email application user interface shown in FIGS. 3 and 4). The document can be provided by any source, including without limitation a web-based application provider, a content provider, a search engine, etc.

At step 604, which is performed by pre-processing module 502, an external program is identified based on the contents of the web document. By way of a non-limiting example, pre-processing module 502 can parse the document to identify each external program defined by one or more elements of the document. In accordance with at least one embodiment, the web document is parsed to identify the element(s) of the web document that are considered to be an external program.

One example of an element that can be identified by the pre-processing module 502 as an external program to be monitored is an <iframe> element containing a reference to an additional web resource (e.g., another web document, web content, etc.). Another example of an element that can be identified by the pre-processing module 502 is an <embed> element, which can be used to embed a media player with controls to playback content (e.g., audio, video or multimedia content) identified (e.g., using the src attribute) in the element. Other examples of an element that can be identified by pre-processing module 502, the <object> element can be used to embed a plug-in, such as a Java® applet, a PDF reader, media player, etc., a <video> element which can be used to play video content, an <audio> element which can be used to play audio content, etc.

Reference is made to FIG. 5, which provides an example of a user interface display 700 rendered by a browser application (e.g., browser application 512). For purposes of illustration, the display 700 includes a display 708 (displayed in tab 702) generated by the browser application and a display 710 (displayed in tab 702) of a portion of the underlying definition of the document used by the browser application to render the display 708 of the document. In the example, of FIG. 7, the tab 702 is selected and the display 708 includes content component 704, which is based on the element 706 (of the underlying definition of the document) highlighted in display 710. Element 706 is considered to be an external program. Element 902 of FIG. 9 is a reproduction of the element 706 highlighted in display 710 of FIG. 7. As can be seen, element 902 is an <iframe> element with a number of attributes, including an id attribute with a value of tgtSKY and a src attribute with a URL for use, by browser application, in retrieving the content component 704.

Referring again to FIG. 6, step 606, which is performed by the listener module 504, listens for inactivity in connection with each identified external program. By way of a non-limiting example, the listener module 504 registers to receive a notification when any of a number of events occur in connection with an external program. In accordance with one or more embodiments, the listener module 504 can modify the document's underlying definition to insert a handleEvent function, or object, for each of a number of events, such as and without limitation a visibility change event and a focus change event.

To illustrate further using the Document Object Model (DOM) interface (a description of which is provided at developer.mozilla.org), an EventTarget provides an interface that can receive events and can have the listener module 504 as a listener. The DOM interface is supported by most browser applications. Examples of a target includes an element, a document and a window. By way of a further non-limiting example, an addEventListener( ) method of EventTarget can be used to indicate the event and the function to be called to handle the event in response to the specified event's occurrence.

Examples of events for which the listener module 504 can establish a call back to receive notification include visibility and focus changes, which can be used to determine whether a window (or tabbed window) is considered inactive, including detecting a minimized window, hidden tab, application out of focus and the like. By way of a non-limiting example a page visibility application programming interface (API) of the DOM interface, which is described at developer.mozilla.org/en-US/docs/Web/API/Page_Visibility_API, can be used to receive notification of visible and hidden events, and to query the current visibility state of a window of a browser application. A visibility change event is sent to a listener to indicate that a window (or tab) becomes invisible, for example, when the user minimizes the window or switches to another tab a web document. The event informs the listener that the visibility state of the window/tab has changed.

As yet another non-limiting example, a FocusEvent API can be used to receive focus (indicating that an element has received focus) and blur (indicating that an element has lost focus) events. As described in more detail below, in accordance with some embodiments, the program suspension module 506 functions to make each external program associated with the window (or tab) inoperable in a case that a window (or tab) becomes invisible or an element (e.g., a page, tab, or element thereof such as and without limitation an iframe, embed, object, video, etc. element) has lost focus (e.g., a change in focus of the user away from the element), and program restoration module 508 functions to make each external program associated with the window (or tab) operable in a case that the window (or tab) becomes visible or an element (e.g., a page, tab, or element thereof such as and without limitation an iframe, embed, object, etc. element) has received focus (e.g., a change in focus of the user toward the element).

At step 608, inactivity is detected in connection with an external program. At step 610, which is performed by program suspension module 506, each external program associated with the detected inactivity is suspended. In accordance with one or more embodiments, an external program is suspended by modifying the definition of the document to render the external program inoperable.

Figure 7:
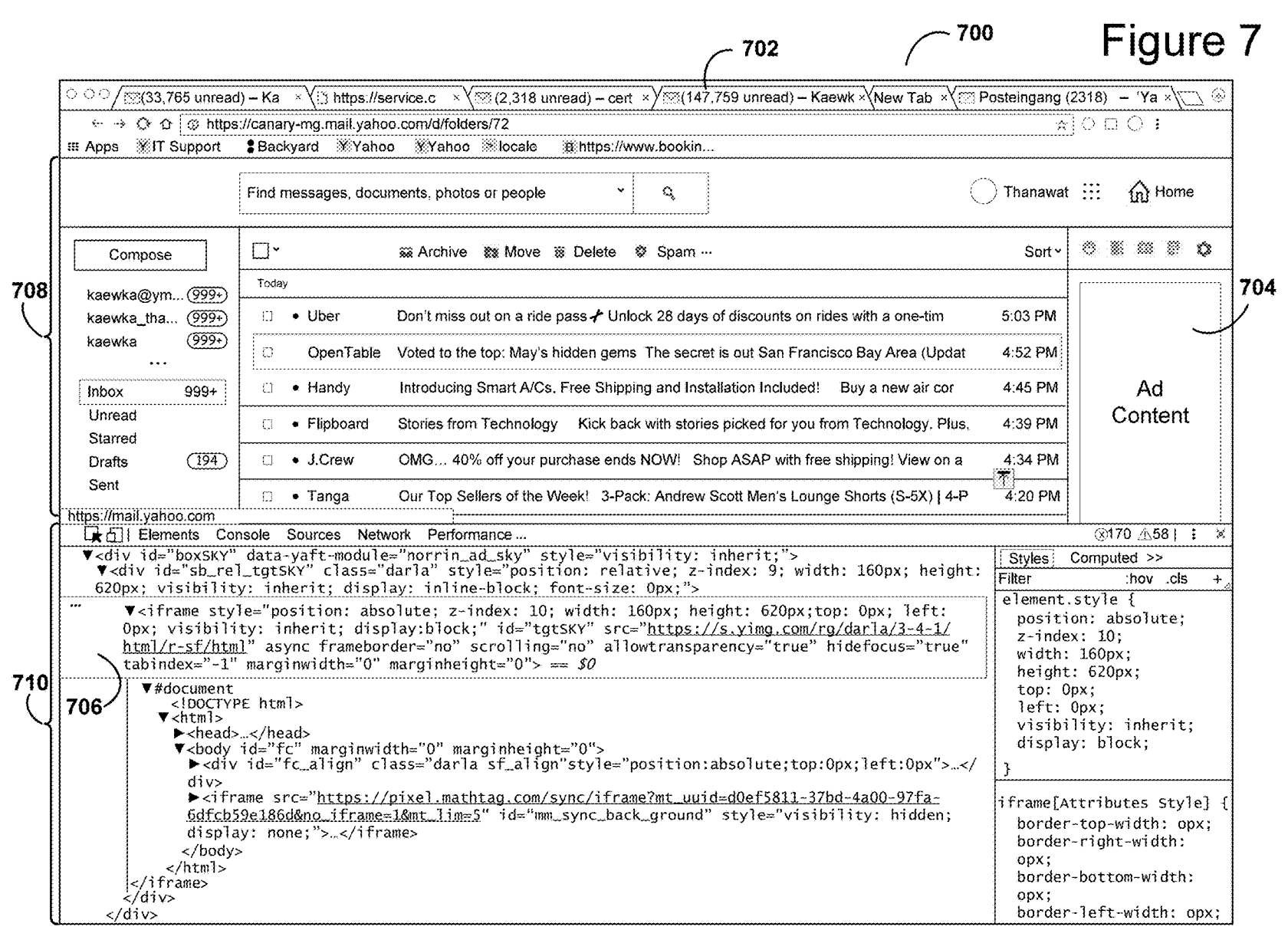
Figure 8:
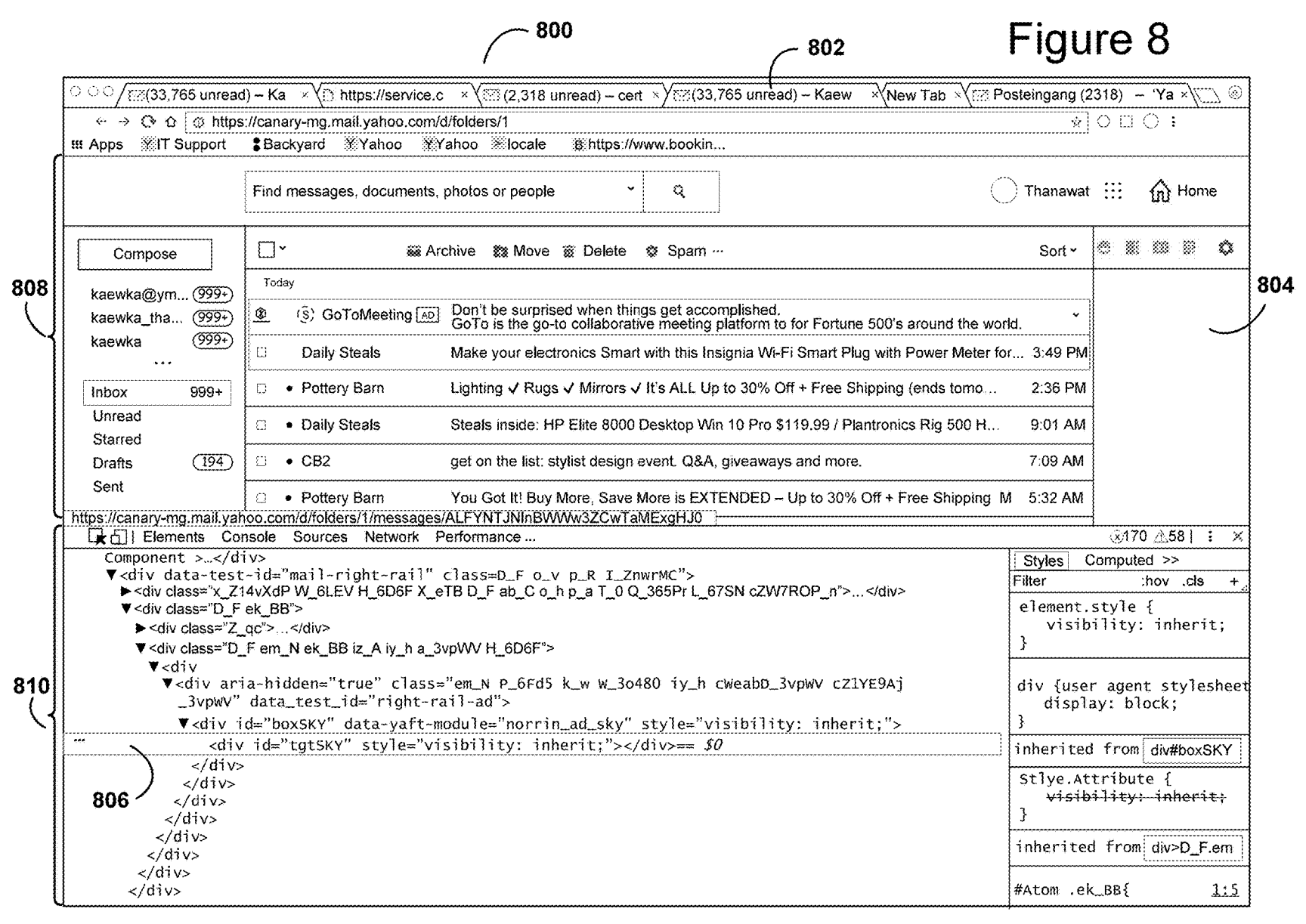

FIG. 8 provides an example of a user interface display 800 rendered by a browser application (e.g., browser application 512). For purposes of illustration, the display 800 includes a display 808 of the page generated by the browser application and the display 810 of a portion of the underlying definition of the document used by the browser application to render the display 808 of the document. In the example, of FIG. 8, the tab 802 is an updated version of tab 702 (of FIG. 7) and display 808 is an update of display 708 (of FIG. 7). Display 808 is based on a modified document definition that includes element 806 (which replaces element 706 of FIG. 7—as a placeholder). The modified definition comprising element 806 suspends the external program and makes it inoperable, such that when the browser application renders display 808 using the modified document definition (including element 806 in place of element 706), the external program is inoperable and is not executed by the browser application. In the example of FIGS. 7 and 8, element 706 is made inoperable (by program suspension module 506 at step 610) by removing the external program from the document definition, and replacing it with element 806, as a placeholder.

Element 904 of FIG. 9 is a reproduction of the element 806 highlighted in FIG. 8. As can be seen, the <iframe> element 902 is replaced by element 904, which in the example is a <div> element that includes an id attribute with the same value, tgISKY, as the <iframe> element 904. Element 904 can be used as a placeholder for element 902. The program suspension module 506 can store a copy of element 902 (e.g., in data store 510). By using the same id attribute value, i.e., tgtSKY, in both elements 902 and 904, elements 902 and 904 can be associated, and element 904 can be used as a placeholder in the modified document definition. Element 902 can be retrieved from storage using the value of the id attribute in element 904 in the modified document definition, so that the placeholder (element 904) can be replaced by the retrieved element 902 to restore element 902 if activity is detected in connection with tab 702 (or corresponding tab 802), thereby rendering element 902 operable in generating a content component for display.

The browser application renders display 808 using to the modified definition which includes element 904 (as a placeholder) in place of element 902. In some embodiments, the browser application may render display 808 using the modified definition in response to a render instruction received by the browser application from the program suspension module 506. In this manner, program suspension module 506 causes the external program to be rendered inoperable. As illustrated by display area 804 in the example of FIG. 8, the modified definition (rendered by the browser using the modified definition of the document) does not include the content component 704.

Referring again to FIG. 6, at step 612 (which is performed by listener module 504), activity is detected in connection with tab 802 of FIG. 8. In response to the activity detection, at step 614 (which is performed by program restoration module 508), the underlying definition (modified by program suspension module 506 at step 610 in response to the inactivity detection) is modified again to restore element 902 in the document definition. In accordance with some embodiments, element 902 (replaced with element 904, by program suspension module 506, in the document definition at step 610) is retrieved from data store 510 and element 902 (which corresponds to element 906) is used, by program restoration module 508, in place of element 904 in the document definition.

The external program is restored in the modified definition, and is executed, or reactivated, when the modified definition is used by the browser application to render a display corresponding to the modified document definition. The browser application renders tab 1002 in display 1008 (of display 1000) of FIG. 10 using the modified definition, which is modified to include element 906 (which corresponds to element 902) in place of element 904. In some embodiments, the browser application may render display 1010 using the modified definition in response to a render instruction received by the browser application from the program restoration module 508. As illustrated by content component 1004 in the example of FIG. 10, the modified definition (a portion of which is shown in display 1010) is used by the browser to render display 1008. As shown in the highlighted portion of display 1010, the modified definition used by the browser application includes element 1006 (corresponding to elements 902 and 906), which is used by the browser application to generate display 1008 including the content component 1004.

In the example of FIG. 9, elements 902 and 906 are the same. It should be understood that element 906 can be different from element 902. Indeed, a display using element 906 might result in different content (i.e., content other than the content displayed in connection with element 902) being displayed. In one example, assuming that the content is advertising content, the content displayed using element 902 can be given advertising content and the content displayed using element 906 can be different advertising content.

It should be understood that an external program can be made inoperable in ways other than by replacing an external program's definition in a document's definition. By way of one example, the external program's definition can be made inoperable by using comment notation to indicate that the external program's definition is a comment, e.g., using a comment tag before the external program's definition and the comment tag after the external program's definition. Then, the browser application can be instructed to render the modified definition, and the external program will be considered (by the browser application) to be a comment and will not activate the external program. Then, when activity is detected, the external program can be restored by removing the commenting notation and instructing the browser application to render the display using the modified definition. The external program will be considered to be executable code and the browser application will not activate the external program.

As yet another example, an external program that adds content such as audio, video multimedia content, can be modified (to suspend the external program) such that playback of the content is paused in the display rendered (using the modified definition) by the browser application, or can be modified (to reactivate or restore) to cause playback in the display rendered (using the modified definition restoring playback) by the browser application. In a case that the <embed> element is used, an autoplay attribute of the element's definition can be modified to have a value of false to deactivate and a value of true to activate. In a case that the <object> element is used, a play parameter can be set to false to deactivate and true to activate. In a case that the <iframe> element is used, the value of an autoplay attribute can be set to activate and another value can be used to deactivate. As yet another example, in a case that a <video> element is used, an autoplay parameter can be removed to deactivate and inserted to activate. In each case, the element definition of the external program is modified to pause playback to suspend the external program and to initiate playback to restore the external program.

FIGS. 11 and 12 provide an example of a user interface 1100 in which playback of a content component 1102 is initially playing (in FIG. 11) and then is paused (in FIG. 12). In accordance with some embodiments, the content begins playing in accordance with a received document definition. In response to detection of inactivity, the document definition is modified a first time (in a manner such as discussed above) to suspend playback in the display rendered by the browser application using the modified document definition. In response to an activity detection, the document definition is modified a second time (in a manner discussed above) to cause playback in the display rendered by the browser application using the modified document definition.

As shown in FIG. 13, internal architecture 1300 of a computing device(s), computing system, computing platform, user devices, set-top box, smart TV and the like includes one or more processing units, processors, or processing cores, (also referred to herein as CPUs) 1312, which interface with at least one computer bus 1302. Also interfacing with computer bus 1302 are computer-readable medium, or media, 1306, network interface 1314, memory 1304, e.g., random access memory (RAM), run-time transient memory, read only memory (ROM), media disk drive interface 1320 as an interface for a drive that can read and/or write to media including removable media such as floppy, CD-ROM, DVD, media, display interface 1310 as interface for a monitor or other display device, keyboard interface 1316 as interface for a keyboard, pointing device interface 1318 as an interface for a mouse or other pointing device, and miscellaneous other interfaces not shown individually, such as parallel and serial port interfaces and a universal serial bus (USB) interface.

Memory 1304 interfaces with computer bus 1302 so as to provide information stored in memory 1304 to CPU 1312 during execution of software programs such as an operating system, application programs, device drivers, and software modules that comprise program code, and/or computer executable process steps, incorporating functionality described herein, e.g., one or more of process flows described herein. CPU 1312 first loads computer executable process steps from storage, e.g., memory 1304, computer readable storage medium/media 1306, removable media drive, and/or other storage device. CPU 1312 can then execute the stored process steps in order to execute the loaded computer-executable process steps. Stored data, e.g., data stored by a storage device, can be accessed by CPU 1312 during the execution of computer-executable process steps.

Persistent storage, e.g., medium/media 1306, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1328 typically provides information communication using transmission media through one or more networks to other devices that use or process the information. For example, network link 1328 may provide a connection through local network 1324 to a host computer 1326 or to equipment operated by a Network or Internet Service Provider (ISP) 1330. ISP equipment in turn provides data communication services through the public, worldwide packet-switching communication network of networks now commonly referred to as the Internet 1332.

A computer called a server host 1334 connected to the Internet 1332 hosts a process that provides a service in response to information received over the Internet 1332. For example, server host 1334 hosts a process that provides information representing video data for presentation at display 1310. It is contemplated that the components of system 1300 can be deployed in various configurations within other computer systems, e.g., host and server.

At least some embodiments of the present disclosure are related to the use of computer system 1300 for implementing some or all of the techniques described herein. According to one embodiment, those techniques are performed by computer system 1300 in response to processing unit 1312 executing one or more sequences of one or more processor instructions contained in memory 1304. Such instructions, also called computer instructions, software and program code, may be read into memory 1304 from another computer-readable medium 1306 such as storage device or network link. Execution of the sequences of instructions contained in memory 1304 causes processing unit 1312 to perform one or more of the method steps described herein.

In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1300. Computer system 1300 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1302 as it is received, or may be stored in memory 1304 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
causing, at a computing device, a first rendering of a display of a browser application using a document definition comprising an external resource reference, the external resource being initiated in connection with the first rendering;
detecting, via the computing device, inactivity in connection with the first rendering;
in response to detecting inactivity, causing, via the computing device, an automatic suspension of the external resource in a second rendering of browser application's display using the document definition modified in a first manner;
detecting, via the computing device, activity in connection with the second rendering; and
in response to detecting activity, causing, via the computing device, an automatic reactivation of the external resource in a third rendering of the browser application's display using the document definition modified in a second manner.

2. The method of claim 1, the performing further comprising:
prior to the first rendering, identifying the external resource reference in the document definition, the identifying comprising:
parsing the document definition to locate a definitional element comprising the external resource reference.

3. The method of claim 2, the external resource reference referencing a web resource, the definitional element comprising a reference to the web resource.

4. The method of claim 2, the definitional element comprising a reference to a content player and content for playback by the content player.

5. The method of claim 2, the external resource comprising a program, the definitional element comprising a reference to the program.

6. The method of claim 1, further comprising:
prior to the first rendering, inserting at least one event handler in the document definition for use in detecting the inactivity, the activity or both.

7. The method of claim 6, the at least one event handler for use in detecting a visibility change event.

8. The method of claim 6, the at least one event handler for use in detecting a focus change event.

9. The method of claim 1, further comprising:
prior to performing the second rendering, modifying the document definition in the first manner, the modifying comprising:
replacing a definitional element comprising the external resource reference with a placeholder element; and
prior to performing the third rendering, modifying the document definition in the second manner, the modifying comprising:
replacing the placeholder element with the retrieved definitional element.

10. The method of claim 9, replacing the placeholder element further comprising:
using at least a portion of the placeholder element to retrieve, from storage, the definitional element for replacing the placeholder element.

11. The method of claim 1, further comprising:
prior to performing the second rendering, modifying the document definition in the first manner, the modifying comprising:
using a comment notation in the document definition to render a definitional element comprising the external resource reference inoperable by the browser application; and
prior to performing the third rendering, modifying the document definition in the second manner, the modifying comprising:
removing the comment notation from the document definition to render the definitional element comprising the external reference operable by the browser application.

12. The method of claim 1, further comprising:
the external resource reference referencing a program and content to be played by the program,
prior to performing the second rendering, modifying the document definition in the first manner, the modifying comprising:
modifying the external resource reference in the document definition such that playback of the content by the program is suspended in the second rendering of the browser application's display; and
prior to performing the third rendering, modifying the document definition in a second manner, the modifying comprising:
modifying the external resource reference in the document definition such that playback of the content by the program is resumed in the third rendering of the browser application's display.

13. The method of claim 12, modifying the document definition in the second manner further comprising modifying the external resource reference to reference different content for playback by the program in the third rendering of the browser application's display.

14. The method of claim 1, the causing and detecting claim elements are performed by a program controller, the program controller causing the browser application to perform the first, second and third rendering at the computing device.

15. The method of claim 14, at least a portion of the program controller is external to the browser application.

16. The method of claim 14, at least a portion of the program controller is hosted by a server computing device.

17. The method of claim 14, at least a portion of the program controller is internal to the browser application.

18. The method of claim 1, the document definition is represented using a Document Object Model (DOM) representation.

19. A non-transitory computer-readable storage medium tangibly encoded with computer-executable instructions that when executed by a processor associated with a computing device perform a method comprising:
causing a first rendering of a display of a browser application using a document definition comprising an external resource reference, the external resource being initiated in connection with the first rendering;
detecting inactivity in connection with the first rendering;

in response to detecting inactivity, causing an automatic suspension of the external resource in a second rendering of browser application's display using the document definition modified in a first manner;

detecting activity in connection with the second rendering; and in response to detecting activity, causing an automatic reactivation of the external resource in a third rendering of the browser application's display using the document definition modified in a second manner.

20. A computing device comprising:

a processor;

a non-transitory storage medium for tangibly storing thereon program logic for execution by the processor, the program logic comprising:

program logic executed by the processor for causing a first rendering of a display of a browser application using a document definition comprising an external resource reference, the external resource being initiated in connection with the first rendering;

program logic executed by the processor for detecting inactivity in connection with the first rendering;

program logic executed by the processor for causing, in response to detecting inactivity, an automatic suspension of the external resource in a second rendering of browser application's display using the document definition modified in a first manner;

program logic executed by the processor for detecting activity in connection with the second rendering; and program logic executed by the processor for causing, in response to detecting activity, an automatic reactivation of the external resource in a third rendering of the browser application's display using the document definition modified in a second manner.

* * * * *